US008649785B2

(12) United States Patent
Durand et al.

(10) Patent No.: US 8,649,785 B2
(45) Date of Patent: Feb. 11, 2014

(54) DEVICE AND METHOD FOR COMMUNICATION BETWEEN A PORTABLE COMPUTER SYSTEM AND ITEMS OF AVIONICS EQUIPMENT

(75) Inventors: Frederic Durand, Toulouse (FR); Frederique Delannoy, Pujaudran (FR); Philippe Moreau, Toulouse (FR); Pierre Depape, Paulhac (FR); Sebastien Delautier, Toulouse (FR); Sebastien Saletzki, Cornebarrieu (FR)

(73) Assignee: Airbus Operations SAS, Toulouse (FR)

( * ) Notice: Subject to any disclaimer, the term of this patent is extended or adjusted under 35 U.S.C. 154(b) by 823 days.

(21) Appl. No.: 12/603,868

(22) Filed: Oct. 22, 2009

(65) Prior Publication Data

US 2010/0105329 A1 Apr. 29, 2010

(30) Foreign Application Priority Data

Oct. 22, 2008 (FR) ..................................... 08 05856

(51) Int. Cl.
*H04W 4/00* (2009.01)
*H04B 5/00* (2006.01)
*H04B 7/00* (2006.01)

(52) U.S. Cl.
USPC .......................... 455/431; 455/41.1; 455/41.2

(58) Field of Classification Search
None
See application file for complete search history.

(56) References Cited

U.S. PATENT DOCUMENTS

| 6,401,013 | B1 | 6/2002 | McElreath | |
|---|---|---|---|---|
| 2001/0036835 | A1* | 11/2001 | Leedom, Jr. ................. | 455/509 |
| 2003/0060218 | A1* | 3/2003 | Billerbeck et al. ............ | 455/501 |
| 2004/0257246 | A1* | 12/2004 | Pahl et al. ..................... | 340/945 |
| 2005/0026608 | A1* | 2/2005 | Kallio et al. .................. | 455/431 |
| 2005/0107681 | A1* | 5/2005 | Griffiths ........................ | 600/410 |
| 2007/0291636 | A1* | 12/2007 | Rajagopal et al. ............ | 370/208 |
| 2009/0292851 | A1* | 11/2009 | Mead et al. ................... | 710/303 |

FOREIGN PATENT DOCUMENTS

WO WO 2006/083788 A1 8/2006

OTHER PUBLICATIONS

U.S. Appl. No. 12/867,190, filed Aug. 11, 2010, Durand, et al.
"AC No. 120-76a Guidelines for the certification, airworthiness, and operational approval of electronic flight bag computing devices", Federal Aviation Administration, Advisory Circular, XP-002533406, Mar. 17, 2003, pp. 1-24, 1-2, 1-4.

* cited by examiner

*Primary Examiner* — Yuwen Pan
*Assistant Examiner* — Ayodeji Ayotunde
(74) *Attorney, Agent, or Firm* — Oblon, Spivak, McClelland, Maier & Neustadt, L.L.P.

(57) ABSTRACT

A device for communication between a portable computer system including a display screen and avionic equipment items comprises shielded walls forming at least a partial Faraday cage. The device also includes at least one wide band high output wireless transmitter-receiver arranged inside the shielded walls and adapted for carrying out a very short range point-to-point radio communication with the portable computer system when the portable computer system is placed inside the shielded walls. The device also includes at least one interface connected to the avionic equipment items and adapted for transmitting data originating from the portable computer system to the avionic equipment items and data originating from the avionic equipment items to the portable computer system, through the at least one said transmitter-receiver.

20 Claims, 3 Drawing Sheets

DEVICE AND METHOD FOR COMMUNICATION BETWEEN A PORTABLE COMPUTER SYSTEM AND ITEMS OF AVIONICS EQUIPMENT

BACKGROUND OF THE INVENTION

1. Field of the Invention

This invention relates to a device and a method for communication between a portable computer system and avionic equipment items. It applies especially to the areas of air transports and in particular deals with use of a very high output wireless technology between the information system of the airplane and a portable terminal used by a pilot or a maintenance operator. This terminal can be, for example, a portable computer, a tablet-type computer ("tablet PC"), a personal digital assistant ("PDA") or a removable monitor.

2. Discussion of the Background

Portable terminals of EFB type (acronym for "Electronic Flight Bag" or electronic flight bag) nowadays are connected by wire to the airplane systems, and this for several reasons. It is a matter, on the one hand, of keeping their performances satisfactory, for example in terms of video link of the EFB to a fixed screen of the airplane; on the other hand, of taking security constraints into account (a physical connection makes it possible to avoid any risk of attack ("hacking") between the terminal and the system of the airplane. Furthermore, it is a matter of preventing problems of electromagnetic interferences. In fact, the power levels of a WiFi link (acronym for "Wireless Fidelity" for fidelity without wire), which is the technology most considered nowadays for this type of application, make an in-flight use difficult.

Very high output point-to-point links, for example of WPAN type (acronym for "Wireless Personal Area Network" for a local personal network without wire), of UWB type (acronym for "Ultra Wide Band" for ultra wide band), are not used in this type of applications, but rather to interconnect peripherals of personal computers or PDA with each other, or for example to interconnect multimedia systems without wiring. Other technologies can be used, such as, for example, wireless USB, or "WUSB" (acronym for "Wireless Universal Serial Bus" for universal serial bus without wire).

SUMMARY OF THE INVENTION

EFB-type mobile terminals are installed in a docking station ("docking station") in order to allow:
- a use of the EFB during the critical phases of flight and in particular to consult the approach maps for landing, accessing airplane data (positions, . . . ),
- the EFB to use the services of the on-board ("on board") infrastructure, for example communication services and recharging the battery of the terminal.

The EFB then is connected physically by one or more connectors to the docking station (also designated as "DS" in the remainder of the document) in order to make it possible to access deported control means such as the keyboard, the airplane data, the on-board infrastructure.

The use of the mobile terminal during non-critical phases (that is, without storage in the docking station) is difficult to accomplish because of the connections (number of connectors between the mobile terminal and the docking station). Furthermore, these repeated operations (at least two times per flight) place heavy demands on the connections and threaten a limited reliability of the system. Moreover, these operations reduce the flexibility of use of the mobile terminal by making it less easy to use when it is installed in a docking station.

Certain airplanes or avionic systems can use a tablet portable computer ("tablet PC") or a removable screen, which necessitate interconnections and performance. The same type of solution as described above then can be considered.

It is essential to make any direct link between the EFB and the systems of the airplane very highly secure. The technologies widely used to date have the drawback of imposing a rather high range for reasonable performances, which makes them vulnerable. For example, the radio signals are accessible outside the airplane or in the cabin.

This invention seeks to remedy these drawbacks.

To this end, according to a first aspect, this invention applies to a device for communication between a portable computer system comprising a display screen and avionic equipment items, characterized in that it comprises:
- at least one wide band high output wireless transmitter-receiver, adapted for carrying out a very short range point-to-point radio communication with the said portable computer system and
- at least one interface connected to the said avionic equipment items and adapted for transmitting data originating from the portable computer system to the avionic equipment items, and data originating from the avionic equipment items to the portable computer system, through at least one said transmitter-receiver.

The invention thus makes it possible to interconnect by a wide band high or very high output wireless technology of WPAN type (Wireless Personal Area Network) an EFB-type terminal or a display terminal of the cockpit with the systems of the cockpit.

It is noted that this invention is not limited to the interconnection of portable computers but extends to the interconnection between docking stations and screens and/or peripherals. Other variants are described in the patent.

Generally speaking, the invention thus makes it possible to resolve, at least partially, the problems:
- of need for high output to have real-time and voluminous data (video) conveyed,
- of reducing connections, to make it possible to increase the reliability of the system,
- of making exchanges secure,
- of simplifying the installation of the system in the airplane, and thus reducing the costs of wiring (in installation as well as in maintenance),
- of using an EFB both as a portable terminal and as a central processing unit ("CPU") because the connection with the on-board systems is permanent and
- of electromagnetic interferences.

The implementation of this invention has advantages in particular in terms:
- of operation, since there is no need for physical connection between the portable system and the avionic equipment items and therefore no problem of connector wear and tear, and reduced installation difficulties,
- of confidentiality, because the very short range of the wide band technologies used offers better conditions for ensuring the confidentiality of exchanges,
- of health risk, since the WPAN-type technologies (for example UWB) are dedicated to domestic uses, therefore designed to limit electromagnetic radiation,
- of risk of interference on the airplane systems, given the considerably lower power level of UWB-type technologies (in comparison with WiFi).

It is seen that the ultra wide band UWB communication system is not subjected to a straight-line link (it then is said that it is "NLOS" for Non Line Of Sight) and is designed for multiple distances.

According to specific characteristics, the said wide band is of UWB type (acronym for "Ultra Wide Band").

According to specific characteristics, the device that is the object of this invention, such as briefly set forth above, comprises a wireless feed.

By virtue of these arrangements, having to connect the portable computer system to the lesser connector is avoided.

According to specific characteristics, the said wireless feed employs an electromagnetic induction.

According to specific characteristics, the said transmitter-receiver is incorporated into a docking station.

According to specific characteristics, the said docking station comprises a second transmitter-receiver adapted for communicating with the said portable computer system when the said portable computer system is located outside the said docking station.

By virtue of these arrangements, the portable computer system can be used in the entire space of the cockpit of an airplane.

According to specific characteristics, the device that is the object of this invention, such as briefly set forth above, comprises a means for automatic switching between the transmitter-receivers adapted for communicating with the said portable computer system according to the power of the signal received by the said transmitter-receivers adapted for communicating with the portable computer system.

By virtue of these arrangements, the user does not have to be concerned about the position of the computer system or manually switching any switch.

According to specific characteristics, the said docking station comprises shielded walls constituting a Faraday cage, at least partially. In this way the confidentiality of data exchanges is even better ensured.

According to a second aspect, this invention applies to a method for communication between a portable computer system comprising a display screen and avionic equipment items, characterized in that it comprises:

a step of broad band high output wireless communicating over a very short range point-to-point radio link with the said portable computer system in order to transmit data originating from avionic equipment items to the portable computer system, and a step of communicating with the said avionic equipment items in order to transmit data originating from the portable computer system to the avionic equipment items.

According to specific characteristics, the method that is the object of this invention, such as briefly set forth above, further comprises a step of automatic switching between at least two transmitter-receivers adapted for communicating with the portable computer system according to the power of the signal received by the said transmitter-receivers.

Since the specific advantages purposes and characteristics of this method are similar of those of the device that is the object of this invention, such as briefly set forth above, they are not repeated here.

BRIEF DESCRIPTION OF THE DRAWINGS

Other specific advantages, purposes and characteristics of this invention will become apparent from the description that is gong to follow, presented with an explanatory and in no way limitative intent with reference to the attached drawings, in which.

DESCRIPTION OF THE PREFERRED EMBODIMENTS

Figure 1:
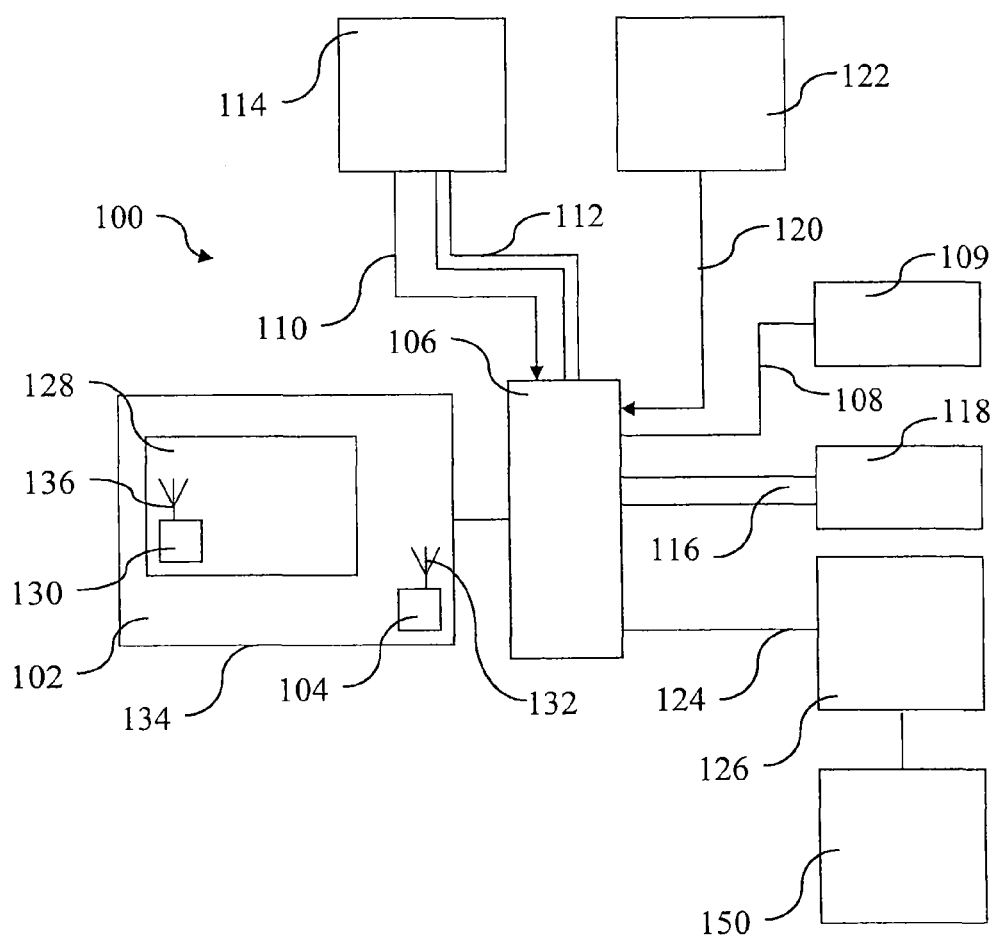
FIG. 1 schematically shows a first embodiment of the device that is the object of this invention, FIG. 2 schematically shows a second embodiment of the device that is the object of this invention.
Figure 2:
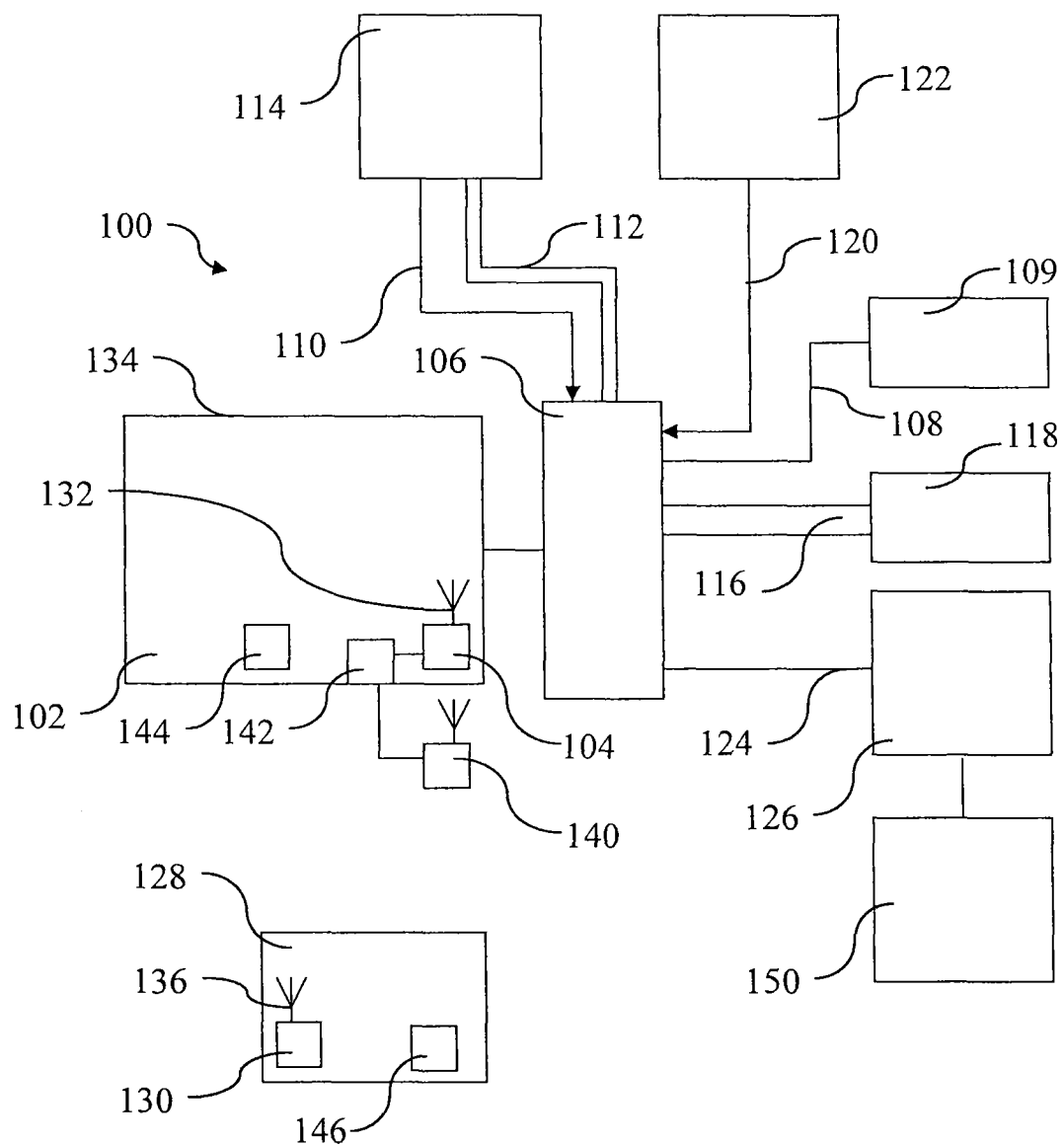

Although, in the description of FIGS. 1 and 2, an electronic flight bag has been shown in wireless communication with avionic equipment items, this invention is not limited to this type of portable computer system but extends, quite unlike all the portable terminals or peripherals and, in particular the display screens, to central units and to data storage units.

There is seen in FIG. 1 a device 100 that is the object of this invention, which comprises a docking station 102 comprising a transmitter-receiver 104 and an interface 106. Interface 106 is connected, by a video link 110 and by feed links 112, to a display screen 114, by links 116, to an electric feed 118, by a data link 120, to a touch-sensitive screen 122 associated with the display screen 114, by a data link 124, to at least one bus 126 or to an ANSU/SIU (acronym for "Aircraft Network Server Unit/Secure Interface Unit" for an airplane network server unit/secure interface unit) and, by a data line 108, to USB ports 109. Bus 126 or the ANSU/SIU are connected to avionic equipment items 150 of known type.

An electronic flight bag EFB 128, equipped with a transmitter-receiver 130, is inserted into docking station 102.

Docking station 102 having shielded conductive walls 134 constitutes a Faraday cage, at least partially.

Transmitter-received 104 is of wide band high output wireless type, for example of UWB type. It is adapted for carrying out a very short range point-to-point radio communication with electronic flight bag 128.

The connection of interface 106 is, on the avionic side, defined in a standard, the ARINC828—it comprises inputs referred to as "429," a VGA video plug, a USB cable, discrete inputs (for location identification) and feed. Furthermore, interface 106 performs conversion of signals of different types. Interface 106 is adapted for transmitting to electronic flight bag 128 the data circulating on bus 126 which are intended therefor and for transmitting to bus 126 the data transmitted by the electronic flight bag.

Electronic flight bag EFB 128, equipped with a transmitter-receiver 130, is inserted into docking station 102.

In the case illustrated in FIG. 1, electronic flight bag 128 is installed in docking station 102. Very short range high output wide band point-to-point radio communication is performed inside docking station 102 in confidential manner, since the docking station, being shielded, constitutes a Faraday cage. To this end, docking station 102 comprises, inside, an antenna 132 and wireless transmitter-receiver 104. Interface 106 comprises a converter for radio signals to or from the interfaces of the avionic system. Electronic flight bag 128 comprises transmitter-receiver 130 identical to the one of docking station 102 and an antenna 136 identical to antenna 132.

In the case illustrated in FIG. 2, docking station 102 is further provided with a second transmitter-receiver 140 equipped with an external antenna and an automatic switch 142 adapted for automatically switching from one transmitter-receiver of docking station 102 to the other, according to the power of the signal that they receive from antenna 136 of bag 128. Communication with electronic flight bag 128 then can be carried out just as well inside docking station 102 as outside, in any position in the cockpit: when electronic flight bag 128 is taken out of docking station 102, it loses the connection with internal antenna 132 and is automatically connected to external antenna 140, and vice versa.

At switch 142, a "handover" (transparent transition) can be activated, which makes it possible not to disrupt communications in progress between electronic flight bag 128 and the avionic systems.

It is noted that since the UWB-type communication systems are NLOS (acronym for "Non Line Of Sight"), that is, not limited to the existence of a direct path in a straight line between transmitter and receiver, and designed for environments favoring multi-distance, the fact that the antenna is positioned on the docking station does not pose any special problem. A solution with an antenna installed more prominently in the cockpit nonetheless can be imagined.

It is seen in FIG. 2 that docking station 102 is equipped with a wireless feed 144 for electronic flight bag 128, for example by electromagnetic induction, bag 128 then comprising the necessary components for receiving electrical power 146. In this case, the docking station preferentially is adapted for mechanically guiding the bag 128 so that the parts for inductive feed of the bag 128 and of docking station 102 are positioned opposite one another when bag 128 is located in docking station 102.

As a variant, bag 128 is replaced by another type of portable computer system, for example a display screen, a mass storage unit, a central unit and/or a portable terminal for maintenance (also called "PMAT"). It is noted that preferentially the portable terminal for maintenance would not be integrated into a docking station but brought along by a maintenance operator, and could be connected with the docking station or a "U" antenna.

Figure 3:
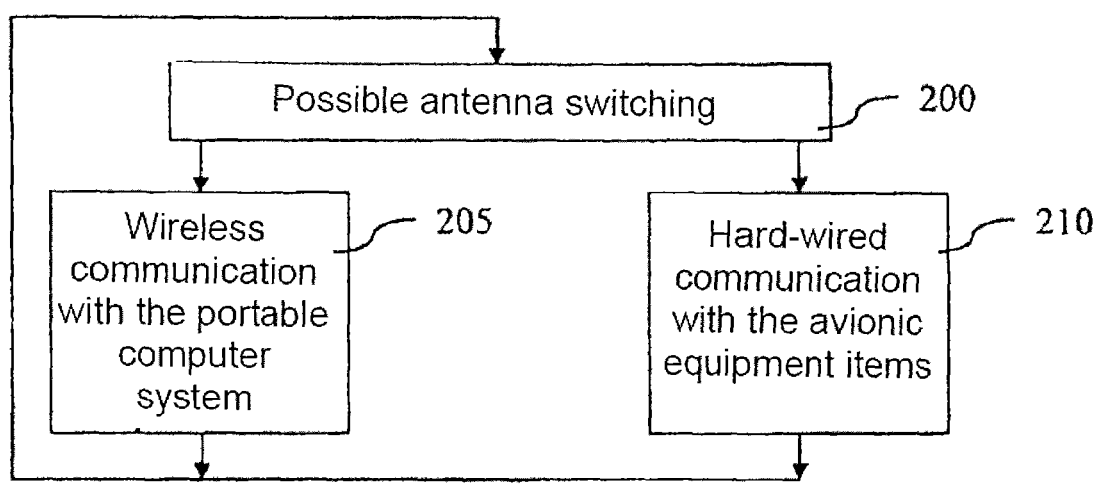
FIG. 3 shows, in the form of a logic diagram, steps implemented in a specific embodiment of the method that is the object of this invention.

It is seen in FIG. 3 that the steps for implementation of the communication method that is the object of this invention comprise, in specific embodiments:
- a step 200 of automatic switching between at least two transmitter-receivers adapted for communicating with the portable computer system according to the power of the signal received by the said transmitter-receivers,
- a step 205 of wide band high output wireless communicating over a very short range point-to-point radio link with the said portable computer system in order to transmit data originating from the avionic equipment items to the portable computer system, and
- a step 210 of communicating with the said avionic equipment items in order to transmit data originating from the portable computer system to the avionic equipment items.

As is understood upon reading of the above description, the implementation of this invention at least partially resolves the problems of:
- need for high output to have real-time and voluminous data (video) conveyed,
- reducing connections, to make it possible to increase the reliability of the system,
- making exchanges secure,
- simplifying the installation of the system in the airplane, and thus reducing the costs of wiring (in installation as well as in maintenance),
- using an EFB both as a portable terminal and as a central processing unit ("CPU") because the connection with the on-board systems is permanent, and
- electromagnetic interferences.

The fact of using a wide band for EFB—airplane information system data exchanges has advantages in terms:
- of operation: unlike "wired" solutions, no need for physical connection, therefore no problem of connector wear and tear/less installation difficulty,
- of performances: the alternative wireless technologies, traditional WiFi and MIMO WiFi offer lesser outputs,
- of confidentiality: the very short range of the wide band technologies used in this patent offer better conditions for ensuring the confidentiality of exchanges,
- no health risk, the technologies,
- low risk of interference on the airplane systems, given the considerably lower level of power of UWB-type technologies (in comparison with WiFi) and
- this type of technology is in the process of standardization by the EEA, which is a proof of continuity.

The invention claimed is:

1. A device for communication between a portable computer system including a display screen and avionic equipment items within an aircraft, the device comprising:
   shielded walls forming at least a partial Faraday cage within the aircraft;
   at least one first wide band high output wireless transmitter-receiver arranged inside the shielded walls and adapted for carrying out a very short range point-to-point radio communication with the portable computer system when the portable computer system is placed inside the shielded walls; and
   at least one interface connected to the avionic equipment items, which are arranged within the aircraft and outside the shielded walls, and adapted for transmitting data originating from the portable computer system to the avionic equipment items outside the shielded walls and data originating from the avionic equipment items outside the shielded walls to the portable computer system by means of the at least one first wide band high output wireless transmitter-receiver.

2. The device according to claim 1, wherein the wide band is an Ultra Wide Band type (UWB).

3. The device according to claim 2, wherein the first transmitter-receiver is incorporated into a docking station.

4. The device according to claim 2, wherein the docking station comprises a second transmitter-receiver adapted for communicating with the portable computer system when the portable computer system is located outside the shielded walls.

5. The device according to claim 4, further comprising means for automatically switching between the first and second transmitter-receivers adapted for communicating with the portable computer system according to a power of signals received by the first and second transmitter-receivers adapted for communicating with the portable computer system.

6. The device according to claim 1, further comprising a wireless feed inside the shielded walls.

7. The device according to claim 6, wherein the wireless feed employs electromagnetic induction to wirelessly provide electrical power to the portable computer system when the portable computer system is placed inside the shielded walls.

8. The device according to claim 1, wherein the transmitter-receiver is incorporated into a docking station.

9. The device according to claim 8, wherein the docking station comprises a second transmitter-received adapted for communicating with the portable computer system when the portable computer system is located outside the shielded walls.

10. The device according to claim 9, further comprising means for automatically switching between the first and second transmitter-receivers adapted for communicating with the portable computer system according to a power of signals received by the first and second transmitter-receivers adapted for communicating with the portable computer system.

11. A method for communication between a portable computer system including a display screen and avionic equipment items within an aircraft, the method comprising:
communicating via a wide band high output wireless signal over a very short range point-to-point radio link with the portable computer system, when the portable computer system is placed inside shielded walls forming at least a partial Faraday cage within the aircraft, in order to transmit data originating from the avionic equipment items, which are arranged within the aircraft and outside the shielded walls, to the portable computer system; and
communicating with the avionic equipment items outside the shielded walls in order to transmit data originating from the portable computer system to the avionic equipment items outside the shielded walls.

12. The method according to claim 11, wherein the communicating via the wide band high output wireless signal includes communicating via an Ultra Wide Band (UWB) type signal.

13. The method according to claim 12, wherein the communicating via the wide band high output wireless signal over the very short range point-to-point radio link is carried out when the portable computer system is located inside a docking station, by employing a first transmitter-receiver, the method further comprising communicating with the portable computer system by employing a second transmitter-receiver, when the portable computer system is located outside the docking station.

14. The method according to claim 13, further comprising:
automatically switching between the first and second transmitter-receivers for communicating with the portable computer system according to a power of the signals received by the first and second transmitter-receivers adapted for communicating with the portable computer system.

15. The method according to claim 11, wherein the communicating via the wide band high output wireless signal over the very short range point-to-point radio link is carried out when the portable computer system is located inside a docking station, by employing a first transmitter-receiver, the method further comprising communicating with the portable computer system by employing a second transmitter-receiver, when the portable computer system is located outside the docking station.

16. The method according to claim 15, further comprising:
automatically switching between the first and second transmitter-receivers for communicating with the portable computer system according to a power of the signals received by the first and second transmitter-receivers adapted for communicating with the portable computer system.

17. The device according to claim 1, wherein the shielded walls are arranged within a cockpit of the aircraft, and the avionic equipment items are arranged within the cockpit of the aircraft and outside the shielded walls.

18. The device according to claim 17, wherein the at least one interface is further adapted for transmitting the data originating from the portable computer system to the avionic equipment items outside the shielded walls and data originating from the avionic equipment items outside the shielded walls to the portable computer system via a data link connected to at least one avionics bus arranged outside the shielded walls.

19. The method according to claim 11, wherein:
the communicating via the wide band high output wireless signal is performed with the shielded walls arranged within a cockpit of the aircraft; and
the communicating with the avionic equipment items is performed with the avionic equipment items arranged within the cockpit of the aircraft and outside the shielded walls.

20. The method according to claim 11, wherein:
the communicating via the wide band high output wireless signal is performed with the shielded walls arranged within a cockpit of the aircraft; and
the communicating with the avionic equipment items is performed via a data link connected to at least one avionics bus arranged outside the shielded walls with the avionic equipment items arranged within the cockpit of the aircraft and outside the shielded walls.

* * * * *